US011008528B2

United States Patent
Hagihara et al.

(10) Patent No.: US 11,008,528 B2
(45) Date of Patent: May 18, 2021

(54) VISCOSITY INDEX IMPROVER AND LUBRICATING OIL COMPOSITION

(71) Applicant: SANYO CHEMICAL INDUSTRIES, LTD., Kyoto (JP)

(72) Inventors: Hiroki Hagihara, Kyoto (JP); Hiroki Hashimoto, Kyoto (JP); Ayumu Sakaguchi, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 0 days.

(21) Appl. No.: 16/493,389

(22) PCT Filed: Mar. 22, 2018

(86) PCT No.: PCT/JP2018/011496
§ 371 (c)(1),
(2) Date: Sep. 12, 2019

(87) PCT Pub. No.: WO2018/174188
PCT Pub. Date: Sep. 27, 2018

(65) Prior Publication Data
US 2020/0071632 A1    Mar. 5, 2020

(30) Foreign Application Priority Data

Mar. 23, 2017   (JP) ............................ JP2017-057549

(51) Int. Cl.
| | | |
|---|---|---|
| C10M 145/14 | (2006.01) | |
| C08F 297/02 | (2006.01) | |
| C08F 297/04 | (2006.01) | |
| C10M 169/04 | (2006.01) | |
| C10M 149/04 | (2006.01) | |
| C10M 153/02 | (2006.01) | |
| C10N 20/04 | (2006.01) | |

(52) U.S. Cl.
CPC ....... *C10M 145/14* (2013.01); *C08F 297/026* (2013.01); *C08F 297/048* (2013.01); *C10M 149/04* (2013.01); *C10M 153/02* (2013.01); *C10M 169/041* (2013.01); *C10M 2203/003* (2013.01); *C10M 2209/084* (2013.01); *C10M 2217/023* (2013.01); *C10M 2225/02* (2013.01); *C10N 2020/04* (2013.01)

(58) Field of Classification Search
CPC ............ C10M 145/14; C10M 169/041; C10M 149/04; C10M 153/02; C10M 2203/003; C10M 2209/084; C10M 2217/023; C10M 2225/02; C08F 297/026; C08F 297/048
See application file for complete search history.

(56) References Cited

U.S. PATENT DOCUMENTS

| | | | | |
|---|---|---|---|---|
| 5,565,130 A | * | 10/1996 | Omeis | ................... C08F 290/04 |
| | | | | 508/262 |
| 5,597,871 A | | 1/1997 | Auschra et al. | |
| 2008/0194443 A1 | | 8/2008 | Stohr et al. | |

(Continued)

FOREIGN PATENT DOCUMENTS

| | | |
|---|---|---|
| EP | 0699694 | 3/1996 |
| EP | 2 186 871 | 5/2010 |

(Continued)

OTHER PUBLICATIONS

International Search Report dated Jun. 5, 2018 in International (PCT) Application No. PCT/JP2018/011496.
Fedors, "A Method for Estimating Both the Solubility Parameters and Molar Volumes of Liquids", Polymer Engineering and Science, 1974, vol. 14, No. 2, pp. 147-154.
Sanyo Chemical News, 2013, No. 476.
Sanyo Chemical News, 2015, No. 493.
English translation of "High-performance viscosity index improvers", Sanyo Chemical Industries Ltd News, 2009, No. 455, pp. 1-11.
Jeti, "Koseino Nendo Shisu Kojozai no Gijutsu Kaihatsu", vol. 57, No. 11, 2009, pp. 188-192.

(Continued)

*Primary Examiner* — Vishal V Vasisth
(74) *Attorney, Agent, or Firm* — Wenderoth, Lind & Ponack, L.L.P.

(57) ABSTRACT

A viscosity index improver containing a copolymer (A) whose essential constituent monomer is a monomer (a) having a number average molecular weight of 800 to 4,000 represented by the following formula (1), the copolymer (A) having a solubility parameter in the range of 9.00 to 9.40:

[Chem. 1]

$$H_2C=\underset{\underset{R^1}{|}}{C}-\underset{\underset{O}{\|}}{C}-X^1-\left[CH_2CH_2-N\underset{\underset{C-CH_2}{\underset{\|}{O}}}{\overset{\overset{O}{\|}}{\overset{C-CH}{|}}}-R^2\right]_p \quad (1)$$

wherein $R^1$ is a hydrogen atom or a methyl group; —$X^1$— is a group represented by —O—, —O(AO)$_m$—, or —NH—, AO is a C2-C4 alkyleneoxy group, m is an integer of 1 to 10, each AO may be the same or different when m is 2 or more, and the (AO)$_m$ moieties may be randomly bonded or block-bonded; $R^2$ is a residue after removal of one hydrogen atom from a hydrocarbon polymer whose essential constituent monomer is butadiene in which the butadiene is present in a proportion of 50% by weight or more based on the weight of $R^2$, or after removal of one hydrogen atom from a polymer formed by partial hydrogenation of the hydrocarbon polymer; and p represents a number of 0 or 1.

12 Claims, No Drawings

(56) References Cited

U.S. PATENT DOCUMENTS

| | | | |
|---|---|---|---|
| 2010/0190671 A1 | 7/2010 | Stoehr et al. | |
| 2011/0306533 A1 | 12/2011 | Eisenberg et al. | |
| 2016/0097017 A1 | 4/2016 | Eisenberg et al. | |
| 2017/0009177 A1 | 1/2017 | Nakada et al. | |
| 2018/0245014 A1 | 8/2018 | Nakada et al. | |

FOREIGN PATENT DOCUMENTS

| | | |
|---|---|---|
| JP | 03-143996 | 6/1991 |
| JP | 06-306130 | 11/1994 |
| JP | 08-169922 | 7/1996 |
| JP | 2732187 | 3/1998 |
| JP | 2754343 | 5/1998 |
| JP | 3474918 | 12/2003 |
| JP | 2005-200454 | 7/2005 |
| JP | 3831203 | 10/2006 |
| JP | 3999307 | 10/2007 |
| JP | 2008-546894 | 12/2008 |
| JP | 2010-532805 | 10/2010 |
| JP | 2013-133460 | 7/2013 |
| JP | 2013-147608 | 8/2013 |
| JP | 2014-009293 | 1/2014 |
| JP | 2014-210844 | 11/2014 |
| JP | 2015-007225 | 1/2015 |
| JP | 2016-169368 | 9/2016 |
| WO | 2009/007147 | 1/2009 |
| WO | 2010/051564 | 5/2010 |
| WO | 2010/102903 | 9/2010 |
| WO | 2012/081180 | 6/2012 |
| WO | 2014/170169 | 10/2014 |
| WO | 2015/129732 | 9/2015 |

OTHER PUBLICATIONS

Robert F. Fedors, "A Method for Estimating Both the Solubility Parameters and Molar Volumes of Liquids", Polymer Engineering and Science, vol. 14, No. 2, 1974, pp. 147-152.

Marika Joona, "Solubility the Most Important Property—But Difficult to Measure", SP Nynas, cited in Third Party Observation filed Jun. 2, 2016 in JP Application No. 2016-505254.

Charles H. Fisher, "Solubility Parameters of Oil and Fat Chemicals", JAOCS, vol. 78, No. 2, 2001, pp. 215-216.

International Preliminary Report on Patentability dated May 19, 2015 in PCT Application No. PCT/JP2015/055358, with English Translation.

International Search Report dated May 19, 2015 in PCT Application No. PCT/JP2015/055358.

Annex (Communication from the Examining Division) dated Sep. 22, 2020 in European Patent Application No. 15 755 830.5.

\* cited by examiner

VISCOSITY INDEX IMPROVER AND LUBRICATING OIL COMPOSITION

This application is a 371 of PCT/JP2018/011496, filed Mar. 22, 2018.

TECHNICAL FIELD

The present invention relates to a viscosity index improver and a lubricating oil composition.

BACKGROUND ART

Lubricating oils such as ATF, CVTF, and MTF for automobile transmissions become less viscous as the temperature increases. For practical use, however, it is preferred that the viscosity hardly changes in a broad range from low to high temperatures, i.e., the viscosity index is high. Recent means to increase the fuel efficiency include reducing the viscosity of a lubricating oil to reduce the viscosity resistance. Yet, reducing the viscosity of a lubricating oil may cause various problems such as oil leakage and galling due to too low viscosity at high temperatures.

As a means to improve the fuel efficiency, a method that uses a viscosity index improver has been proposed. A lubricating oil having a higher viscosity index has lower viscosity resistance at low temperatures, leading to an improvement of the fuel efficiency. Thus, a method including adding a viscosity index improver to a lubricating oil to improve the temperature dependence of the viscosity has been widely used. Known examples of such a viscosity index improver include a methacrylic acid ester copolymer (Patent Literature 1), an olefin copolymer (Patent Literature 2), and a macromonomer copolymer (Patent Literatures 3 to 8).

Yet, the lubricating oil composition is still insufficient in viscosity index-improving effect, long-term shear stability, and low-temperature characteristics at start up.

CITATION LIST

Patent Literature

Patent Literature 1: JP 3999307 B
Patent Literature 2: JP 2005-200454 A
Patent Literature 3: WO 2008/546894
Patent Literature 4: WO 2009/007147
Patent Literature 5: WO 2010/051564
Patent Literature 6: WO 2010/102903
Patent Literature 7: WO 2014/170169
Patent Literature 8: WO 2015/129732

SUMMARY OF INVENTION

Technical Problem

The present invention aims to provide a viscosity index improver having an excellent viscosity index-improving effect and a lubricating oil composition in which a shear-induced reduction in viscosity during use is small and which generates no shear-induced precipitate during long-term use.

Solution to Problem

As a result of extensive studies, the present inventors completed the present invention.

Specifically, the present invention relates to a viscosity index improver containing a copolymer (A) whose essential constituent monomer is a monomer (a) having a number average molecular weight of 800 to 4,000 represented by the following formula (1), the copolymer (A) having a solubility parameter in the range of 9.00 to 9.40. The present invention also relates to a lubricating oil composition containing at least one base oil selected from the group consisting of API Group I to IV base oils, GTL base oils, and synthetic lubricant base oils and the viscosity index improver, wherein the amount of the copolymer (A) in the lubricating oil composition is 0.1 to 20% by weight,

[Chem. 1]

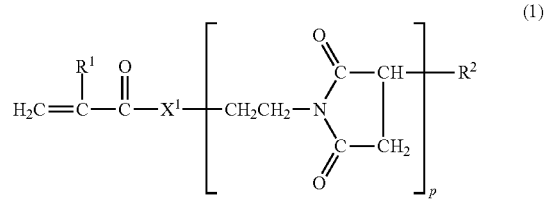

wherein $R^1$ is a hydrogen atom or a methyl group; $—X^1—$ is a group represented by $—O—$, $—O(AO)_m—$, or $—NH—$, AO is a C2-C4 alkyleneoxy group, m is an integer of 1 to 10, each AO may be the same or different when m is 2 or more, and the $(AO)_m$ moieties may be randomly bonded or block-bonded; $R^2$ is a residue after removal of one hydrogen atom from a hydrocarbon polymer whose essential constituent monomer is butadiene in which the butadiene is present in a proportion of 50% by weight or more based on the weight of $R^2$, or after removal of one hydrogen atom from a polymer formed by partial hydrogenation of the hydrocarbon polymer; and p represents a number of 0 or 1.

Advantageous Effects of Invention

The present invention provides a viscosity index improver and a lubricating oil composition containing the viscosity index improver in which the viscosity index is high, a shear-induced reduction in viscosity during use is small, and the long-term stability is excellent because no shear-induced precipitate is generated during long-term use. The present invention also achieves an effect that suppresses an increase in viscosity at low temperatures.

DESCRIPTION OF EMBODIMENTS

The present invention provides a viscosity index improver containing a copolymer (A) whose essential constituent monomer is a monomer (a) having a number average molecular weight of 800 to 4,000 represented by the following formula (1), the copolymer (A) having a solubility parameter in the range of 9.00 to 9.40,

[Chem. 2]

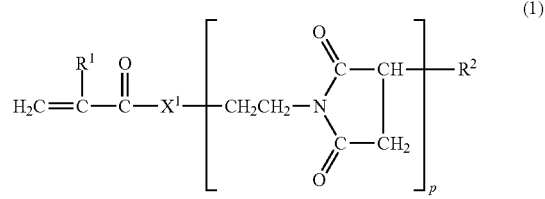

wherein $R^1$ is a hydrogen atom or a methyl group; —$X^1$— is a group represented by —O—, —O(AO)$_m$—, or —NH—, AO is a C2-C4 alkyleneoxy group, m is an integer of 1 to 10, each AO may be the same or different when m is 2 or more, and the (AO)$_m$ moieties may be randomly bonded or block-bonded; $R^2$ is a residue after removal of one hydrogen atom from a hydrocarbon polymer whose essential constituent monomer is butadiene in which the butadiene is present in a proportion of 50% by weight or more based on the weight of $R^2$, or after removal of one hydrogen atom from a polymer formed by partial hydrogenation of the hydrocarbon polymer; and p represents a number of 0 or 1.

For example, Patent Literatures 3 to 8 disclose use of a copolymer having a polyolefin-based monomer in a viscosity index improver. Yet, since the polyolefin-based monomer has a large molecular weight, when the polymer chain breaks after being exposed to long-term shear, it results in a portion that does not contain a polyolefin-based monomer necessary to maintain the solubility. Thus, a precipitate results from long-term shear. When the copolymer has a solubility parameter (hereinafter abbreviated as "SP value") of smaller than 9.00, the viscosity index improver has poor viscosity index-improving effect. When the copolymer has an SP value greater than 9.40, the viscosity index improver has poor solubility in a base oil, or a precipitate is resulted from long-term shear.

In contrast, the viscosity index improver of the present invention has good viscosity index-improving effect and shear stability, and can also withstand long-term shear.

In the present invention, the copolymer (A) has an SP value of preferably 9.00 to 9.40 (cal/cm$^3$)$^{1/2}$, more preferably 9.05 to 9.35 (cal/cm$^3$)$^{1/2}$, particularly preferably 9.10 to 9.30 (cal/cm$^3$)$^{1/2}$. When the SP value is less than 9.00, the viscosity index tends to decrease. When the SP value is greater than 9.40, the solubility tends to be poor, and the long-term stability tends to be insufficient. The SP value in the present invention is a value calculated by the Fedors method (described in Polymer Engineering and Science, February, 1974, Vol. 14, No. 2, pp. 147-154).

The monomer (a) constituting the copolymer (A) is represented by the formula (1). In the formula (1), $R^1$ is a hydrogen atom or a methyl group. Of these, a methyl group is preferred in view of viscosity index-improving effect. In the formula (1), —$X^1$— is a group represented by —O—, —O(AO)$_m$— or NH—.

AO is a C2-C4 alkyleneoxy group.

Examples of the C2-C4 alkyleneoxy group include an ethyleneoxy group, a 1,2- or 1,3-propyleneoxy group, and a 1,2-, 1,3- or 1,4-butyleneoxy group.

m is an addition mole number of alkylene oxide, and it is an integer of 1 to 10. In view of viscosity index-improving effect, it is an integer of preferably 1 to 4, more preferably 1 or 2.

When m is 2 or more, each AO may be the same or different, the (AO)$_m$ moieties may be randomly bonded or block-bonded.

—$X^1$— is preferably a group represented by —O— or —O(AO)$_m$—, more preferably a group represented by —O— or —O(CH$_2$CH$_2$O)$_1$—, in view of viscosity index-improving effect.

p is a number of 0 or 1.

In the formula (1), $R^2$ is a residue after removal of one hydrogen atom from a hydrocarbon polymer whose essential constituent monomer is butadiene in which the butadiene is present in a proportion of 50% by weight or more based on the weight of $R^2$, or after removal of one hydrogen atom from a polymer formed by partial hydrogenation of the hydrocarbon polymer.

$R^2$ may also contain the following constituent monomers (1) to (3) and the like in addition to butadiene.
(1) An aliphatic unsaturated hydrocarbon (e.g., C2-C36 olefins (e.g., ethylene, propylene, isobutylene, 1-butene, 2-butene, pentene, heptene, diisobutylene, octene, dodecene, octadecene, triacontene, and hexatriacontene) and C4-C36 dienes (e.g., isoprene, 1,4-pentadiene, 1,5-hexadiene, and 1,7-octadiene))
(2) An alicyclic unsaturated hydrocarbon (e.g., cyclohexene, (di)cyclopentadiene, pinene, limonene, indene, vinylcyclohexene, and ethylidenebicycloheptene)
(3) An aromatic group-containing unsaturated hydrocarbon (e.g., styrene, α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, vinylnaphthalene, divinylbenzene, divinyltoluene, divinylxylene, and trivinylbenzene).

The hydrocarbon polymer formed from these monomers may be a block polymer or random polymer. If the hydrocarbon polymer has a double bond, the double bond may be partially or completely hydrogenated by hydrogenation.

The weight average molecular weight (hereinafter abbreviated as "Mw") and the number average molecular weight (hereinafter abbreviated as "Mn") of the monomer (a) can be measured by gel permeation chromatography (hereinafter abbreviated as "GPC") under the following two conditions.

Measurement condition 1 is different from measurement condition 2 in terms of measurement temperature, standard substance, and the like. In production examples, measurement results under the measurement condition 1 and the measurement condition 2 are described.

<Measurement Condition 1 for Mw and Mn of Monomer (a)>
Device: "HLC-8320GPC" (Tosoh Corporation)
Column: "TSKgel GMHXL" (Tosoh Corporation), two columns "TSKgel Multipore $H_{XL}$-M", one column
Measurement temperature: 35° C.
Sample solution: 0.25% by weight solution in tetrahydrofuran
Amount of solution to be injected: 10.0 μl
Detector: Refractive index detector
Standard substance: Standard 1,2-polybutadiene 5 samples (molecular weight: 1,200, 2,200, 3,200, 5,600, 12,000, and 20,000) (PSS)
<Measurement Condition 2 for Mw and Mn of Monomer (a)>
Device: "HLC-8320GPC" (Tosoh Corporation)
Column: "TSKgel GMHXL" (Tosoh Corporation), two columns "TSKgel Multipore $H_{XL}$-M", one column
Measurement temperature: 40° C.
Sample solution: 0.25% by weight solution in tetrahydrofuran
Amount of solution to be injected: 10.0 μl
Detector: Refractive index detector
Standard substance: Standard polystyrene (TS standard substance: standard polystyrene (TSK standard polystyrene) 12 samples (molecular weight: 589, 1,050, 2,630, 9,100, 19,500, 37,900, 96,400, 190,000, 355,000, 1,090,000, 2,110,000, and 4,480,000) (Tosoh Corporation)

The Mn of the monomer (a) is preferably 800 to 4,000, still more preferably 1,000 to 3,500, particularly preferably 1,200 to 3,000. When the Mn of the monomer (a) is less than 800, the viscosity index-improving effect tends to decrease. When the Mn is more than 4,000, the long-term shear stability may be poor. The "Mn" as used herein refers to a value measured under the measurement condition 1 of GPC.

To achieve the effect of the present invention, the molecular weight of copolymer segments per repeating unit of the monomer (a) as calculated by the following formula (1) is preferably 2,500 to 11,000.

Molecular weight of copolymer segments per repeating unit=$M \times A/a$     (1)

In the formula, M is the weight average molecular weight of the monomer (a); a is the total weight of the monomer (a) constituting the copolymer (A); and A is the total weight of all monomers constituting the copolymer (A).

When there are two or more kinds of monomers (a) constituting the copolymer (A), M is an arithmetic mean by weight percentage of the weight average molecular weight of each monomer (a).

When there are two or more kinds of monomers (a) constituting the copolymer (A), a is the total weight of all the monomers (a).

When the molecular weight of the copolymer segments per repeating unit is more than 11,000, breakage of the polymer chain after being exposed to long-term shear is likely to result in a portion that does not contain the monomer (a), possibly resulting in a precipitate. When the molecular weight is less than 2,500, the viscosity index-improving effect tends to be poor.

The "Mw" of the monomer (a) as used herein refers to a value measured under the GPC measurement condition 1.

The monomer (a) can be obtained by esterification of a (co)polymer (Y) containing a hydroxyl group at one end, which is obtained by introducing a hydroxyl group into a hydrocarbon polymer at one end, with (meth)acrylic acid, or by transesterification of the (co)polymer (Y) with an alkyl (meth)acrylate such as methyl (meth)acrylate. The term "(meth)acryl" means methacryl or acryl.

The (co)polymer (Y) is preferably one having a specific SP value in view of solubility in the lubricating oil. The range of the SP value is preferably 7.0 to 9.0 $(cal/cm^3)^{1/2}$, more preferably 7.3 to 8.5 $(cal/cm^3)^{1/2}$.

The SP value of the (co)polymer (Y) can also be calculated by the method described above. The SP value of the (co)polymer (Y) can be set to fall within a desired range by suitably adjusting the SP value and the molar fraction of the monomers to be used.

Specific examples of the (co)polymer (Y) containing a hydroxyl group at one end include the following (Y1) to (Y3).

Alkylene oxide adduct (Y1): Examples include products such as those obtained by adding an alkylene oxide (e.g., ethylene oxide or propylene oxide) to a (co)polymer obtained by polymerizing an unsaturated hydrocarbon (x) in the presence of an ion polymerization catalyst (e.g., sodium catalyst).

Hydroborated product (Y2): Examples include products such as those obtained by hydroboration of a (co)polymer of the unsaturated hydrocarbon (x) having a double bond at one end (e.g., the one described in U.S. Pat. No. 4,316,973).

Maleic anhydride-ene-amino alcohol adduct (Y3): Examples include products such as those obtained by imidization of a reaction product by using aminoalcohol, the reaction product being obtained by an ene reaction between maleic anhydride and a (co)polymer of the unsaturated hydrocarbon (x) having a double bond at one end.

Product obtained by hydroformylation and hydrogenation (Y4): Examples include products such as those obtained by hydroformylation of a (co)polymer of the unsaturated hydrocarbon (x) having a double bond at one end, followed by hydrogenation (e.g., the one described in JP S63-175096 A).

Of these, the (co)polymer (Y) containing a hydroxyl group at one end is preferably the alkylene oxide adduct (Y1), the hydroborated product (Y2), or the maleic anhydride-ene-amino alcohol adduct (Y3), more preferably the alkylene oxide adduct (Y1).

In the formula (1), the proportion of butadiene of all the monomers constituting $R^2$ is 50% by weight or more, preferably 75% by weight or more, more preferably 85% by weight or more, still more preferably 90% by weight or more, in view of viscosity index-improving effect.

In the formula (1), a structure derived from butadiene constituting a part or all of $R^2$ has a molar ratio of 1,2-adduct to 1,4-adduct (1,2-adduct/1,4-adduct) of preferably 5/95 to 95/5, more preferably 30/70 to 80/20, particularly preferably 40/60 to 70/30, in view of viscosity index-improving effect and low-temperature viscosity.

In the formula (1), the 1,2-adduct/1,4-adduct molar ratio in the structure derived from butadiene constituting a part or all of $R^2$ can be measured by $^1$HNMR, $^{13}$CNMR, or Raman spectroscopy, for example.

The proportion of the monomer (a) constituting the copolymer (A) is preferably 10 to 50% by weight, more preferably 15 to 40% by weight, most preferably 15 to 35% by weight, based on the copolymer (A), in view of viscosity index-improving effect and shear stability.

When the proportion of the monomer (a) is less than 10%, the solubility and the long-term stability tend to be poor. When the proportion of the monomer (a) is more than 50%, the viscosity index-improving effect tends to be poor.

The copolymer (A) of the present invention is preferably a copolymer containing an alkyl (meth)acrylate (b) having a C1-C4 alkyl group (hereinafter also referred to as a "monomer (b)") as a constituent monomer, in view of viscosity index-improving effect. Examples of the alkyl (meth)acrylate (b) having a C1-C4 alkyl group include methyl (meth)acrylate, ethyl (meth)acrylate, propyl (meth)acrylate, and butyl (meth)acrylate.

Of these, the monomer (b) is preferably methyl (meth)acrylate, ethyl (meth)acrylate, or butyl (meth)acrylate, particularly preferably ethyl (meth)acrylate or butyl (meth)acrylate.

In view of viscosity index-improving effect, the (co)polymer (A) of the present invention is preferably a copolymer containing a monomer (c) represented by the following formula (2) as a constituent monomer:

[Chem. 3]

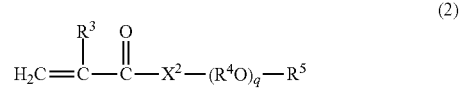

(2)

wherein $R^3$ is a hydrogen atom or a methyl group; —$X^2$— is a group represented by —O— or —NH—; $R^4$O is a C2-C4 alkyleneoxy group; $R^5$ is a C1-C8 alkyl group; and q is an integer of 1 to 20, each $R^4$O may be the same or different when q is 2 or more, and the $(R^4O)_q$ moieties may be randomly bonded or block-bonded.

In the formula (2), $R^3$ is a hydrogen atom or a methyl group. In view of viscosity index-improving effect, a methyl group is preferred.

In the formula (2), —$X^2$— is a group represented by —O— or —NH—. In view of viscosity index-improving effect, a group represented by —O— is preferred.

In the formula (2), $R^4$ is a C2-C4 alkylene group. Examples of the C2-C4 alkylene group include groups such as ethylene, isopropylene, 1,2- or 1,3-propylene, isobutylene, and 1,2-, 1,3-, or 1,4-butylene groups.

In the formula (2), q is an integer of 1 to 20. In view of viscosity index-improving effect and low temperature viscosity, q is preferably an integer of 1 to 5, more preferably an integer of 1 or 2.

When q is 2 or more, each $R^4O$ may be the same or different, and the $(R^4O)_q$ moieties may be randomly bonded or block-bonded.

In the formula (2), $R^5$ is a C1-C8 alkyl group. Specific examples include groups such as methyl, ethyl, n-propyl, isopropyl, n-butyl, isobutyl, t-butyl, n-heptyl, isoheptyl, n-hexyl, 2-ethylhexyl, n-pentyl, and n-octyl groups.

In view of viscosity index, the C1-C8 alkyl group is preferably a C1-C8 alkyl group, more preferably a C1-C6 alkyl group, particularly preferably a C1-C5 alkyl group alkyl group, most preferably a C2 or C4 alkyl group.

Specific examples of the monomer (c) include methoxyethyl (meth)acrylate, ethoxyethyl (meth)acrylate, propoxyethyl (meth)acrylate, butoxyethyl (meth)acrylate, pentyloxyethyl (meth)acrylate, hexyloxyethyl (meth)acrylate, heptyloxyethyl (meth)acrylate, octyloxyethyl (meth)acrylate, methoxypropyl (meth)acrylate, ethoxypropyl (meth)acrylate, propoxypropyl (meth)acrylate, butoxypropyl (meth)acrylate, pentyloxypropyl (meth)acrylate, hexyloxypropyl (meth)acrylate, heptyloxypropyl (meth)acrylate, octyloxypropyl (meth)acrylate, methoxybutyl (meth)acrylate, ethoxybutyl (meth)acrylate, propoxybutyl (meth)acrylate, butoxybutyl (meth)acrylate, pentyloxybutyl (meth)acrylate, hexyloxybutyl (meth)acrylate, heptyloxybutyl (meth)acrylate, octyloxybutyl (meth)acrylate, and esters of (meth)acrylic acid and C1-C8 alcohols with 2 to 20 moles of ethylene oxide, propylene oxide, or butylene oxide.

In view of viscosity index-improving effect, the monomer (c) is preferably ethoxyethyl (meth)acrylate or butoxyethyl (meth)acrylate.

Preferably, the copolymer (A) of the present invention is a copolymer further containing, as a constituent monomer, at least one of an alkyl (meth)acrylate (d) having a C12-C36 linear alkyl group (hereinafter also referred to as "monomer (d)") or a monomer (e) represented by the following formula (3), in view of solubility in the base oil.

Examples of the alkyl (meth)acrylate (d) having a C12-C36 linear alkyl group include n-dodecyl (meth)acrylate, n-tridecyl (meth)acrylate, n-tetradecyl (meth)acrylate, n-pentadecyl (meth)acrylate, n-hexadecyl (meth)acrylate, n-octadecyl (meth)acrylate, n-icosyl (meth)acrylate, n-tetracosyl (meth)acrylate, n-triacontyl (meth)acrylate, and n-hexatriacontyl (meth)acrylate.

The monomer (d) is preferably an alkyl (meth)acrylate having a C12-C28 linear alkyl group, more preferably an alkyl (meth)acrylate having a C12-C24 linear alkyl group, particularly preferably an alkyl (meth)acrylate having a C12-C20 linear alkyl group.

Two or more kinds of monomers (d) may be used in combination.

[Chem. 4]

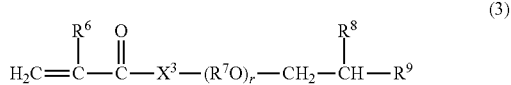

In the formula 3, $R^6$ is a hydrogen atom or a methyl group; —$X^3$— is a group represented by —O— or —NH—; $R^7O$ is a C2-C4 alkyleneoxy group; $R^8$ and $R^9$ are each independently a C4-C24 linear alkyl group; and r is an integer of 0 to 20, each $R^7O$ may be the same or different when r is 2 or more, and the $(R^7O)_r$ moieties may be randomly bonded or block-bonded.

In the formula (3), $R^6$ is a hydrogen atom or a methyl group. In view of viscosity index-improving effect, a methyl group is preferred.

In the formula (3), —$X^3$— is a group represented by —O— or —NH—. In view of viscosity index-improving effect, a group represented by —O— is preferred.

In the formula (3), $R^7$ is a C2-C4 alkylene group. Examples of the C2-C4 alkylene group include groups such as ethylene, isopropylene, 1,2- or 1,3-propylene, isobutylene, and 1,2-, 1,3-, or 1,4-butylene groups.

In the formula (3), r is an integer of 0 to 20. In view of viscosity index-improving effect, r is preferably an integer of 0 to 5, more preferably an integer of 0 to 2.

When r is 2 or more, each $R^7O$ may be the same or different, and the $(R^7O)_r$ moieties may be randomly bonded or block-bonded.

In the formula (3), $R^8$ and $R^9$ are each independently a C4-C24 linear alkyl group. Specific examples include groups such as n-butyl, n-heptyl, n-hexyl, n-pentyl, n-octyl, n-nonyl, n-decyl, n-undecyl, n-dodecyl, n-tetradecyl, n-hexadecyl, n-octadecyl, n-eicosyl, and n-tetracosyl groups.

In view of viscosity index, the C4-C24 linear alkyl group is preferably a C6-C24 linear alkyl group, more preferably a C6-C20 linear alkyl group, particularly preferably a C8-C16 linear alkyl group.

Of these, the monomer (e) is preferably an alkyl (meth)acrylate having a C12-C36 branched alkyl group, more preferably an alkyl (meth)acrylate having a C14-C32 branched alkyl group, particularly preferably an alkyl (meth)acrylate having a C16-C28 branched alkyl group, in view of solubility in the base oil and low-temperature viscosity.

The C12-C36 branched alkyl group is an alkyl group including moieties containing $R^8$ and $R^9$ in the formula (3).

Specific examples of the monomer (e) include 2-octyldecyl (meth)acrylate, an ester of ethylene glycol mono-2-octylpentadecyl ether and a (meth)acrylic acid, 2-octyldodecyl (meth)acrylate, 2-decyltetradecyl (meth)acrylate, 2-dodecylhexadecyl (meth)acrylate, 2-tetradecyloctadecyl (meth)acrylate, 2-dodecylpentadecyl (meth)acrylate, 2-tetradecylheptadecyl (meth)acrylate, 2-hexadecylheptadecyl (meth)acrylate, 2-heptadecylicosyl (meth)acrylate, 2-hexadecyldocosyl (meth)acrylate, 2-eicosyldocosyl (meth)acrylate, 2-tetracosylhexacosyl (meth)acrylate, and N-2-octyldecyl (meth)acrylamide.

Two or more kinds of monomers (e) may be used in combination.

In addition to the monomers (a) to (e), the copolymer (A) of the present invention may further contain, as a constituent monomer, at least one monomer selected from the group consisting of a nitrogen atom-containing monomer (f), a hydroxyl group-containing monomer (g), a phosphorus atom-containing monomer (h), and an aromatic ring-containing vinyl monomer (i). Examples of the nitrogen atom-containing monomer (f) include the following monomers (f1) to (f4), excluding the monomer (a), the monomer (c), and the monomer (e).

Amide group-containing monomer (f1):

Examples include (meth)acrylamides, monoalkyl (meth)acrylamides (those in which one C1-C4 alkyl group is bonded to a nitrogen atom, such as N-methyl (meth)acrylamide, N-ethyl (meth)acrylamide, N-isopropyl (meth)acrylamide, N-n-butyl (meth)acrylamide, and N-isobutyl (meth)acrylamide), N—(N'-monoalkylaminoalkyl)(meth)acrylamides (those having an aminoalkyl group (C2-C6) in which one C1-C4 alkyl group is bonded to a nitrogen atom, such as N—(N'-methylaminoethyl)(meth)acrylamide, N—(N'-ethylaminoethyl)(meth)acrylamide, N—(N'-isopropylamino-n-butyl)(meth)acrylamide, N—(N'-n-butylamino-n-butyl)(meth)acrylamide, and N—(N'-isobutylamino-n-butyl)(meth)acrylamide), dialkyl (meth)acrylamides (those in which two C1-C4 alkyl groups are bonded to a nitrogen atom, such as N,N-dimethyl (meth)acrylamide, N,N-diethyl (meth)acrylamide, N,N-diisopropyl (meth)acrylamide, and N,N-di-n-butyl (meth)acrylamide), N—(N',N'-dialkylaminoalkyl)(meth)acrylamides (those having an aminoalkyl group (C2-C6) in which two C1-C4 alkyl groups are bonded to a nitrogen atom of an aminoalkyl group, such as N—(N',N'-dimethylaminoethyl)(meth)acrylamide, N—(N',N'-diethylaminoethyl)(meth)acrylamide, N—(N',N'-dimethylaminopropyl)(meth)acrylamide, and N—(N',N'-di-n-butylaminobutyl)(meth)acrylamide); N-vinyl carboxylic acid amides (such as N-vinylformamide, N-vinylacetamide, N-vinyl-n-propionic acid amide, N-vinyl-isopropionic acid amide, and N-vinylhydroxyacetamide).

Nitro group-containing monomer (f2):
Examples include 4-nitrostyrene.
Primary to tertiary amino group-containing monomer (f3):

Examples include primary amino group-containing monomers (C3-C6 alkenyl amines (such as (meth)allylamine and crotylamine), and aminoalkyl (C2-C6) (meth)acrylates (such as aminoethyl (meth)acrylate)); secondary amino group-containing monomers (monoalkylaminoalkyl (meth)acrylates (those having an aminoalkyl group (C2-C6) in which one C1-C6 alkyl group is bonded to a nitrogen atom, such as N-t-butylaminoethyl (meth)acrylate and N-methylaminoethyl (meth)acrylate), and C6-C12 dialkenylamines (such as di(meth)allylamine)); tertiary amino group-containing monomers (dialkylaminoalkyl (meth)acrylates (those having an aminoalkyl group (C2-C6) in which two C1-C6 alkyl groups are bonded to a nitrogen atom, such as N,N-dimethylaminoethyl (meth)acrylate and N,N-diethylaminoethyl (meth)acrylate), alicyclic (meth)acrylates having a nitrogen atom (such as morpholinoethyl (meth)acrylate), aromatic monomers (such as N—(N',N'-diphenylaminoethyl)(meth)acrylamide, N,N-dimethylaminostyrene, 4-vinylpyridine, 2-vinylpyridine, N-vinylpyrrole, N-vinylpyrrolidone, and N-vinylthiopyrrolidone)), and hydrochlorides, sulfates, phosphates, and lower alkyl (C1-C8) monocarboxylates (examples of monocarboxylic acids include acetic acid and propionic acid) of these monomers.

Nitrile group-containing monomer (f4):
Examples include (meth)acrylonitrile.
The monomer (f) is preferably the monomer (f1) or (f3), more preferably N—(N',N'-diphenylaminoethyl)(meth)acrylamide, N—(N',N'-dimethylaminoethyl)(meth)acrylamide, N—(N',N'-diethylaminoethyl)(meth)acrylamide, N—(N',N'-dimethylaminopropyl)(meth)acrylamide, N,N-dimethylaminoethyl (meth)acrylate, or N,N-diethylaminoethyl (meth)acrylate.

Hydroxyl group-containing monomer (g):
Examples include hydroxyl group-containing aromatic monomers (such as p-hydroxystyrene), hydroxyalkyl (C2-C6) (meth)acrylates (such as 2-hydroxyethyl (meth)acrylate, and 2- or 3-hydroxypropyl (meth)acrylate), mono- or bis-hydroxyalkyl (C1-C4) substituted (meth)acrylamides (such as N,N-bis(hydroxymethyl)(meth)acrylamide, N,N-bis(hydroxypropyl)(meth)acrylamide, and N,N-bis(2-hydroxybutyl)(meth)acrylamide), vinyl alcohol, C3-C12 alkenols (such as (meth)allyl alcohol, crotyl alcohol, isocrotyl alcohol, 1-octenol, and 1-undecenol), C4-C12 alkene monools or alkene diols (such as 1-buten-3-ol, 2-buten-1-ol, and 2-butene-1,4-diol), hydroxyalkyl (C1-C6) alkenyl (C3-C10) ethers (such as 2-hydroxyethylpropenyl ether), and alkenyl (C3-C10) ethers or (meth)acrylates of polyhydric alcohols having 3 to 8 hydroxyl groups (such as glycerol, pentaerythritol, sorbitol, sorbitan, diglycerol, sugars, and sucrose) (such as (meth)allylether of sucrose).

Examples include polyoxyalkylene glycols (the carbon number of the alkylene group is C2-C4, and the polymerization degree is 2 to 50), polyoxyalkylene polyols (polyoxyalkylene ethers of the polyhydric alcohols having 3 to 8 hydroxyl groups (the carbon number of the alkylene group is C2-C4, and the polymerization degree is 2 to 100)), and mono(meth)acrylates of alkyl (C1-C4) ethers of polyoxyalkylene glycols or polyoxyalkylene polyols (such as polyethylene glycol (Mn: 100 to 300) mono(meth)acrylate, polypropylene glycol (Mn: 130 to 500) mono(meth)acrylate, methoxy polyethylene glycol (Mn: 110 to 310) (meth)acrylate, lauryl alcohol ethylene oxide adduct (2 to 30 moles) (meth)acrylate, and polyoxyethylene (Mn: 150 to 230) sorbitan mono(meth)acrylate).

Examples of the phosphorus-containing monomer (h) include the following monomers (h1) and (h2).

Phosphate group-containing monomer (h1):
Examples include (meth)acryloyloxyalkyl (C2-C4) phosphate esters [such as (meth)acryloyloxyethyl phosphate and (meth)acryloyloxy isopropyl phosphate] and alkenyl phosphate esters [such as vinyl phosphate, allyl phosphate, propenyl phosphate, isopropenyl phosphate, butenyl phosphate, pentenyl phosphate, octenyl phosphate, decenyl phosphate, and dodecenyl phosphate]. The term "(meth)acryloyloxy" means acryloyloxy or methacryloyloxy.

Phosphono group-containing monomer (h2):
Examples include (meth)acryloyloxy alkyl (C2-C4) phosphonic acids [such as (meth)acryloyloxyethyl phosphonic acid] and alkenyl (C2-C12) phosphonic acids [such as vinylphosphonic acid, allylphosphonic acid, and octenylphosphonic acid].

The monomer (h) is preferably the monomer (h1), more preferably a (meth)acryloyloxyalkyl (C2-C4) phosphate ester, particularly preferably (meth)acryloyloxyethyl phosphate.

Aromatic ring-containing vinyl monomer (i):
Examples include styrene, α-methylstyrene, vinyltoluene, 2,4-dimethylstyrene, 4-ethylstyrene, 4-isopropylstyrene, 4-butylstyrene, 4-phenylstyrene, 4-cyclohexylstyrene, 4-benzylstyrene, 4-crotylbenzene, indene, and 2-vinylnaphthalene.

Of these, the monomer (i) is preferably styrene or α-methylstyrene, more preferably styrene.

The copolymer (A) may be a copolymer further containing, as a constituent monomer, a monomer (j) having two or more unsaturated groups, in addition to the monomers (a) to (i).

Examples of the monomer (j) having two or more unsaturated groups include divinylbenzene, C4-C12 alkadienes (such as butadiene, isoprene, 1,4-pentadiene, 1,6-heptadiene, and 1,7-octadiene), (di)cyclopentadiene, vinylcyclohexene and ethylidenebicycloheptene, limonene, ethylene di(meth)acrylate, polyalkylene oxide glycol di(meth)acrylate, pentaerythritol triallyl ether, pentaerythritol tri(meth)acrylate, pentaerythritol tetra(meth)acrylate, trimethylolpropane tri(meth)acrylate, and esters disclosed in International Publication WO 01/009242 such as an ester of an unsaturated carboxylic acid having an Mn of 500 or more and glycol and an ester of an unsaturated alcohol and a carboxylic acid.

The copolymer (A) may contain the following monomers (k) to (n) as constituent monomers, in addition to the monomers (a) to (j).

Vinyl esters, vinyl ethers, vinyl ketones (k):

Examples include vinyl esters of C2-C12 saturated fatty acids (such as vinyl acetate, vinyl propionate, vinyl butyrate, and vinyl octanoate), C1-C12 alkyl, aryl or alkoxyalkyl vinyl ether (methyl vinyl ether, ethyl vinyl ether, propyl vinyl ether, butyl vinyl ether, 2-ethylhexyl vinyl ether, phenyl vinyl ether, vinyl-2-methoxyethyl ether, and vinyl-2-butoxyethyl ether), and C1-C8 alkyl or aryl vinyl ketones (such as methyl vinyl ketone, ethyl vinyl ketone, and phenyl vinyl ketone).

Epoxy group-containing monomer (l):

Examples include glycidyl (meth)acrylate and glycidyl (meth)allyl ether.

Halogen-containing monomer (m):

Examples include vinyl chloride, vinyl bromide, vinylidene chloride, (meth)allyl chloride, and halogenated styrene (such as dichlorostyrene).

Ester of unsaturated polycarboxylic acid (n):

Examples include alkyl, cycloalkyl, or aralkyl esters of unsaturated polycarboxylic acids (C1-C8 alkyl diesters (dimethyl maleate, dimethyl fumarate, diethyl maleate, and dioctylmaleate) of unsaturated dicarboxylic acids (such as maleic acid, fumaric acid, and itaconic acid)).

The Mw and Mn of the copolymer (A) are measured by GPC under the following two types of conditions. The "Mw" and "Mn" of the copolymer (A) as used herein refer to the values measured under the measurement condition 1.

The copolymer (A) has an Mw of preferably 5,000 to 2,000,000, more preferably 5,000 to 300,000, still more preferably 10,000 to 250,000, particularly preferably 15,000 to 220,000, most preferably 30,000 to 200,000, in view of viscosity index-improving effect and shear stability of the lubricating oil composition.

When the Mw is less than 5,000, the viscosity-temperature characteristic-improving effect and the viscosity index-improving effect are insufficient. It may also be disadvantageous in terms of cost because the amount of the viscosity index improver to be added increases. When the Mw is more than 2,000,000, the shear stability tends to be poor.

The copolymer (A) has an Mn of preferably 2,500 or more, more preferably 5,000 or more, particularly preferably 7,500 or more, most preferably 15,000 or more. The Mn is also preferably 150,000 or less, more preferably 125,000 or less, particularly preferably 10,000 or less, most preferably 75,000 or less.

When the Mn is less than 2,500, the viscosity-temperature characteristic-improving effect and the viscosity index-improving effect are insufficient. It may also be disadvantageous in terms of cost because the amount of the viscosity index improver to be added increases. When the Mn is more than 100,000, the shear stability tends to be poor.

<Measurement Condition 1 for Mw and Mn of Copolymer (A)>

Device: "HLC-8320GPC" (Tosoh Corporation)
Column: "TSKgel GMHXL" (Tosoh Corporation), two columns "TSKgel Multipore $H_{XL}$-M", one column
Measurement temperature: 40° C.
Sample solution: 0.25% by weight solution in tetrahydrofuran
Amount of solution to be injected: 10.0 μl
Detector: Refractive index detector
Standard substance: Standard polystyrene (TS standard substance: standard polystyrene (TSK standard polystyrene) 12 samples (molecular weight: 589, 1,050, 2,630, 9,100, 19,500, 37,900, 96,400, 190,000, 355,000, 1,090,000, 2,110,000, and 4,480,000) (Tosoh Corporation)

<Measurement Condition 2 for Mw and Mn of Copolymer (A)>

Device: "HLC-8320GPC" (Tosoh Corporation)
Column: "TSKgel GMHXL" (Tosoh Corporation), two columns "TSKgel Multipore $H_{XL}$-M", one column
Measurement temperature: 40° C.
Sample solution: 0.25% by weight solution in tetrahydrofuran
Amount of solution to be injected: 10.0 μl
Detector: Refractive index detector
Standard substance: Standard poly(methyl methacrylate) 12 samples (molecular weight: 589, 1,050, 2,630, 9,100, 19,500, 37,900, 96,400, 190,000, 355,000, 1,090,000, 2,110,000, and 4,480,000)

The proportion of the monomer (b) constituting the copolymer (A) is preferably 1 to 80% by weight, more preferably 5 to 70% by weight, particularly preferably 10 to 65% by weight, most preferably 15 to 60% by weight, based on the weight of the copolymer (A), in view of viscosity index-improving effect.

The proportion of the monomer (c) constituting the copolymer (A) is preferably 0 to 60% by weight, more preferably 1 to 50% by weight, particularly preferably 5 to 40% by weight, based on the weight of the copolymer (A), in view of viscosity index-improving effect.

The proportion of the monomer (d) constituting the copolymer (A) is preferably 0 to 40% by weight, more preferably 1 to 30% by weight, particularly preferably 3 to 20% by weight, based on the weight of the copolymer (A), in view of viscosity index-improving effect.

The proportion of the monomer (e) constituting the copolymer (A) is preferably 0 to 40% by weight, more preferably 1 to 30% by weight, particularly preferably 3 to 20% by weight, based on the weight of the copolymer (A), in view of viscosity index-improving effect.

Preferably, the copolymer (A) contains, as constituent monomers, 10 to 50% by weight of the monomer (a), 1 to 80% by weight of the monomer (b), 0 to 60% by weight of the monomer (c), 0 to 40% by weight of the monomer (d), and 0 to 40% by weight of the monomer (e), based on the weight of the copolymer (A).

The copolymer (A) can be obtained by a known production method. Specific examples include a method in which the monomer is subjected to solution polymerization in a solvent in the presence of a polymerization catalyst.

Examples of the solvent include toluene, xylene, C9-C10 alkylbenzenes, methyl ethyl ketone, mineral oils, synthetic oils, and mixtures thereof.

Examples of the polymerization catalyst include azo catalysts (such as 2,2'-azobis(2-methylbutyronitrile) and 2,2'-azobis(2,4-dimethylvaleronitrile)), peroxide catalysts (such as benzoyl peroxide, cumyl peroxide, and lauryl peroxide), and redox catalysts (such as mixtures of benzoyl peroxide and tertiary amines). In order to adjust the molecular weight, if necessary, a known chain transfer agent (such as C2-C20 alkylmercaptans) can also be used.

The polymerization temperature is preferably 25° C. to 140° C., more preferably 50° C. to 120° C. The copolymer (A) can also be obtained by bulk polymerization, emulsion polymerization, or suspension polymerization, other than the solution polymerization.

The copolymer (A) may be a random addition polymer or an alternating copolymer; or the copolymer (A) may be a graft copolymer or a block copolymer.

Preferably, the viscosity index improver of the present invention further contains a (co)polymer (B) represented by the following formula (4), in addition to the copolymer (A):

[Chem. 5]

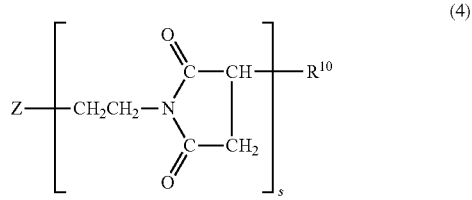

(4)

wherein Z is a hydrogen atom, a methyl group, or a group represented by Y—X$^4$—; Y is a hydrogen atom or a (meth)acryloyl group; —X$^4$— is a C1-C10 alkylene group or a group represented by —O—, —O(AO)$_t$—, or —NH—, AO is a C2-C4 alkyleneoxy group, t is an integer of 1 to 10, each AO may be the same or different when t is 2 or more, and the (AO)$_t$ moieties may be randomly bonded or block-bonded; and R$^{10}$ is a polymer of at least one monomer selected from the group consisting of a C2-C18 olefin, a C4-C10 alkadiene, and a C8-C17 styrene derivative, or when the polymer has an unsaturated group, R$^{10}$ is a residue after removal of one hydrogen atom from the polymer in which the unsaturated group is partially or completely hydrogenated; and s is a number of 0 or 1.

The weight ratio (A)/(B) of the copolymer (A) to the (co)polymer (B) is preferably 90/10 to 99.8/0.2, still more preferably 91/9 to 99.5/0.5, particularly preferably 92/8 to 99/1, in view of viscosity index-improving effect and productivity.

The lubricating oil composition of the present invention contains the viscosity index improver of the present invention and a base oil. The base oil is at least one selected from the group consisting of API Group I to IV base oils, GTL base oils, and synthetic lubricant base oils (ester-based synthetic base oils). Of these, Group III mineral oils and GTL base oils are preferred. The kinetic viscosity of the base oil at 100° C. (measured according to JIS K 2283) is preferably 1 to 15 mm$^2$/s, more preferably 2 to 5 mm$^2$/s, in view of viscosity index and low-temperature fluidity.

The viscosity index of the base oil (measured according to JIS K 2283) is preferably 90 or more in view of the viscosity index and low-temperature fluidity of the lubricating oil composition.

The cloudy point of the base oil (measured according to JIS K 2269) is preferably −5° C. or lower, more preferably −15° C. or lower. With the base oil having a cloudy point in this range, the lubricating oil composition tends to have good low-temperature viscosity.

Preferably, in the lubricating oil composition of the present invention, the amount of the copolymer (A) in the viscosity index improver is 0.1 to 20% by weight based on the total weight of the lubricating oil composition.

The lubricating oil composition of the present invention may contain various additives. Examples of the additives are described below.

(1) Detergent:

Examples include basic, overbased, or neutral metal salts [such as overbased metal salts or alkaline earth metal salts of sulfonates (such as petroleum sulfonate, alkylbenzene sulfonate, and alkylnaphthalene sulfonate)], salicylates, phenates, naphthanates, carbonates, phosphonates, and mixtures of these detergents.

(2) Dispersant:

Examples include succinimides (bis- or mono-polybutenyl succinimides), Mannich condensates, and borates.

(3) Antioxidant:

Examples include hindered phenols and aromatic secondary amines.

(4) Oiliness Improver:

Examples include long-chain fatty acids and their esters (such as oleic acid and its ester), long-chain amines and their amides (such as oleylamine and oleylamide).

(5) Pour Point Depressant

Examples include polyalkylmethacrylates and ethylene-vinyl acetate copolymers.

(6) Friction and Wear Modifier:

Examples include molybdenum-based compounds and zinc-based compounds (such as molybdenum dithiophosphate, molybdenum dithiocarbamate, and zinc dialkyldithiophosphate).

(7) Extreme Pressure Additive:

Examples include sulfur-based compounds (mono- or disulfide, sulfoxide, and sulfur phosphide compounds), phosphide compounds, and chlorinated compounds (such as chlorinated paraffin).

(8) Defoamer:

Examples include silicone oils, metallic soap, fatty acid ester, and phosphate compounds.

(9) Demulsifier:

Examples include quaternary ammonium salts (such as tetraalkyl ammonium salt), sulfonated oil and phosphates (such as phosphates of polyoxyethylene-containing nonionic surfactant), and hydrocarbon-based solvents (toluene, xylene, and ethyl benzene).

(10) Metal Deactivator

Examples include nitrogen atom-containing compounds (e.g., benzotriazole), nitrogen atom-containing chelate compounds (e.g., N,N'-disalicylidene-1,2-diaminopropane), and nitrogen/sulfur atom-containing compounds (e.g., 2-(n-dodecylthio)benzimidazole);

(11) Corrosion Inhibitor:

Examples include nitrogen-containing compounds (such as benzotriazole and 1,3,4-thiadiazolyl-2,5-bisdialkyldithiocarbamate).

Only one of these additives may be added, or, if necessary, two or more thereof may be added. A mixture of these additives may be referred to as a performance additive or a package additive, and such a mixture may be added.

The amount of each of these additives is usually 0.1 to 15% by weight based on the total amount of the lubricating oil composition. The total amount of these additives is usually 0.1 to 30% by weight, preferably 0.3 to 20% by weight, based on the total amount of the lubricating oil composition.

The lubricating oil composition of the present invention is suitably used for gear oils (e.g., differential oil and industrial gear oil), MTF, transmission fluids (e.g., ATF, DCTF, and belt-CVTF), traction fluids (e.g., toroidal-CVTF), shock absorber fluids, power steering fluids, and hydraulic oils (e.g., construction machinery hydraulic oil and industrial hydraulic oil).

The present invention is described in detail below with reference to examples, but the present invention is not limited to these examples.

PRODUCTION EXAMPLE 1

A pressure-resistant reaction vessel equipped with a temperature adjuster and a stirring blade was charged with degassed and dehydrated cyclohexane (500 parts by weight) and 1,3-butadiene (30 parts by weight), and then tetrahydrofuran (2 parts by weight) and n-butyllithium (1.6 parts by weight) were added thereto. The mixture was polymerized at a polymerization temperature of 70° C.

After the polymerization rate (conversion rate) reached almost 100%, ethylene oxide (4.0 parts by weight) was added for reaction at 50° C. for 3 hours. Water (100 parts by weight) and a 1 N aqueous solution of hydrochloric acid (25 parts by weight) were added to terminate the reaction, followed by stirring at 80° C. for 1 hour. The organic phase of the reaction solution was collected in a separating funnel, and the temperature was raised to 70° C. Then, the solvent was removed over 2 hours at the same temperature under a reduced pressure of 10 to 20 Torr.

Thus, a polybutadiene containing a hydroxyl group at one end was obtained, which was then transferred to a reaction vessel equipped with a temperature adjuster, a stirring blade, a hydrogen inlet tube, and a hydrogen outlet. Tetrahydrofuran (80 parts by weight) was added thereto, and the polybutadiene was uniformly dissolved therein by stirring. A suspension of a mixture of palladium carbon (5 parts by weight) and tetrahydrofuran (20 parts by weight) was poured into the mixture. Then, a reaction was carried out for 8 hours at room temperature while hydrogen was supplied to the suspension at a flow rate of 30 mL/min through the hydrogen inlet tube. Subsequently, the palladium carbon was removed by filtration, and the resulting filtrate was heated to 70° C. Then, the tetrahydrofuran was removed at the same temperature under a reduced pressure of 10 to 20 Torr. Thus, a hydrogenated polybutadiene polymer containing a hydroxyl group at one end (Y1-2) was obtained.

The molecular weight of (Y1-2) was measured by GPC.

The Mw was 1,420 and the Mn was 1,300 under the measurement condition 1. The Mw was 2,700 and the Mn was 2,630 under the measurement condition 2.

PRODUCTION EXAMPLE 2

A pressure-resistant reaction vessel equipped with a temperature adjuster and a stirring blade was charged with degassed and dehydrated cyclohexane (500 parts by weight), 1,3-butadiene (30 parts by weight), and styrene (3.3 parts by weight), and then tetrahydrofuran (3.8 parts by weight) and n-butyllithium (0.75 parts by weight) were added thereto. The mixture was polymerized at a polymerization temperature of 70° C.

After the polymerization rate (conversion rate) reached almost 100%, ethylene oxide (1.9 parts by weight) was added for reaction at 50° C. for 3 hours. A subsequent procedure was carried out as in Production Example 1. Thus, a hydrogenated butadiene-styrene copolymer containing a hydroxyl group at one end (Y1-3) was obtained.

The molecular weight of (Y1-3) was measured by GPC. The Mw was 3,600 and the Mn was 3,040 under the measurement condition 1. The Mw was 5,600 and the Mn was 4,750 under the measurement condition 2.

PRODUCTION EXAMPLE 3

A pressure-resistant reaction vessel equipped with a temperature adjuster and a stirring blade was charged with degassed and dehydrated cyclohexane (500 parts by weight) and 1,3-butadiene (30 parts by weight), and then tetrahydrofuran (3.8 parts by weight) and n-butyllithium (0.41 parts by weight) were added thereto. The mixture was polymerized at a polymerization temperature of 70° C.

After the polymerization rate (conversion rate) reached almost 100%, ethylene oxide (1.0 part by weight) was added for reaction at 50° C. for 3 hours. A subsequent procedure was carried out as in Production Example 1. Thus, a hydrogenated polybutadiene polymer containing a hydroxyl group at one end (Y'1-1) was obtained.

The molecular weight (Y'1-1) was measured by GPC. The Mw was 5,200 and the Mn was 4,730 under the measurement condition 1. The Mw was 7,840 and the Mn was 6,840 under the measurement condition 2.

PRODUCTION EXAMPLE 4

A reaction vessel equipped with a temperature adjuster, a stirring blade, a dropping funnel, a nitrogen inlet, and a nitrogen outlet was charged with tetrahydrofuran (400 parts by weight), sodium borohydride (4.1 parts by weight), and 2-methyl-2-butene (10 parts by weight), and the mixture was stirred in a nitrogen stream at room temperature for 10 minutes. Then, boron trifluoride-diethyl ether complex (Wako Pure Chemical Corporation) (18.5 parts by weight) was dropped to the mixture, and the mixture was stirred for 1 hour after the dropping was finished. Subsequently, a mixture solution of polybutene containing an unsaturated group at one end (product name; "NOF polybutene 10N", NOF Corporation) (100 parts by weight) and tetrahydrofuran (200 parts by weight) was dropped to the mixture, and hydroboration was carried out at 25° C. for 4 hours after the dropping was finished. Subsequently, water (50 parts by weight) was gradually added to the reaction product, and then 3 N NaOH aqueous solution (50 parts by weight), and 30% by weight hydrogen peroxide (40 parts by weight) were added thereto, followed by stirring at room temperature for 2 hours. The supernatant was collected in a separating funnel, and the temperature was raised to 50° C. Then, the solvent was removed over 2 hours at the same temperature under a reduce pressure (20 Torr or less). Thus, a hydroborated polybutene containing an unsaturated group at one end (Y'2-1) was obtained.

The molecular weight of (Y'2-1) was measured by GPC. The Mw was 1,670 and the Mn was 980 under the measurement condition 1. The Mw was 2,700 and the Mn was 1,580 under the measurement condition 2.

PRODUCTION EXAMPLE 5

A reaction vessel equipped with a temperature adjuster, a stirring blade, a dropping funnel, a nitrogen inlet, and a nitrogen outlet was charged with tetrahydrofuran (400 parts by weight), sodium borohydride (4.1 parts by weight), and 2-methyl-2-butene (10 parts by weight), and the mixture was stirred in a nitrogen stream at room temperature for 10 minutes. Then, boron trifluoride-diethyl ether complex (Wako Pure Chemical Corporation) (18.5 parts by weight) was dropped to the mixture, and the mixture was stirred for 1 hour after the dropping was finished. Subsequently, a mixture solution of polybutene containing an unsaturated group at one end (product name; "Glissopal 2300", BASF) (230 parts by weight) and tetrahydrofuran (250 parts by weight) was dropped to the mixture, and hydroboration was carried out at 25° C. for 4 hours after the dropping was finished. Subsequently, water (50 parts by weight) was gradually added to the reaction product, and then 3 N NaOH aqueous solution (50 parts by weight), and 30% by weight hydrogen peroxide (40 parts by weight) were added thereto, followed by stirring at room temperature for 2 hours. The supernatant was collected in a separating funnel, and the temperature was raised to 50° C. Then, the solvent was removed over 2 hours at the same temperature under a reduce pressure (20 Torr or less). Thus, a hydroborated polybutene containing an unsaturated group at one end (Y'2-2) was obtained.

The molecular weight of (Y'2-2) was measured by GPC. The Mw was 4,100 and the Mn was 2,300 under the measurement condition 1. The Mw was 5,500 and the Mn was 3,430 under the measurement condition 2.

PRODUCTION EXAMPLE 6

A SUS pressure-resistant reaction vessel equipped with a temperature adjuster and a stirrer was charged with polybutene containing an unsaturated group at one end (product name; "NOF Corporation polybutene 200N", NOF Corporation) (500 parts by weight) and maleic anhydride [Wako Pure Chemical Corporation] (18.5 parts by weight), and the temperature was raised to 220° C. while stirring. Then, an ene reaction was carried out for 12 hours at the same temperature. After the temperature was cooled to 180° C., unreacted maleic anhydride was removed over 3 hours at the same temperature under a reduced pressure (12 Torr or less). Subsequently, the temperature was cooled to 25° C., and 2-aminoethanol (28 parts by weight) was added thereto. The temperature was raised to 130° C. while stirring. Then, an imidization reaction was carried out for 4 hours at the same temperature. Unreacted 2-aminoethanol was removed over 2 hours at 120° C. to 130° C. under a reduced pressure (12 Torr or less). Thus, a maleic anhydride-ene-amino alcohol adduct of polybutene containing an unsaturated group at one end (Y'3-1) was obtained.

The molecular weight of (Y'3-1) was measured by GPC. The Mw was 6,800 and the Mn was 3,030 under the measurement condition 1. The Mw was 11,150 and the Mn was 4,740 under the measurement condition 2.

The polymers provided in the above production examples and other polymers having a hydroxyl group at one end (Y1-1) and (Y'1-2) were provided as listed below.

(Y1-1): Hydrogenated polybutadiene polymer containing a hydroxyl group at one end (product name "HLBHP 1500", Cray Valley), Mw=1,800, Mn=1,670, molar ratio of 1,2-adduct/1,4-adduct=65/35

(Y1-2): Hydrogenated polybutadiene polymer containing a hydroxyl group at one end obtained in Production Example 1, Mw=1,420, Mn=1,300, molar ratio of 1,2-adduct/1,4-adduct=40/60

(Y1-3): Hydrogenated butadiene-styrene copolymer containing a hydroxyl group at one end obtained in Production Example 2, Mw=3,600, Mn=3,040, molar ratio of 1,2-adduct/1,4-adduct=60/40

(Y'1-1): Hydrogenated polybutadiene polymer containing a hydroxyl group at one end obtained in Production Example 3, Mw=5,200, Mn=4,730, molar ratio of 1,2-adduct/1,4-adduct=60/40

(Y'1-2): Hydrogenated polybutadiene polymer containing a hydroxyl group at one end; (product name "Krasol HLBH 5000M", Cray Valley), Mw=5,370, Mn=5,190, molar ratio of 1,2-adduct/1,4-adduct=65/35

(Y'2-1): Hydroborated polybutene containing an unsaturated group at one end obtained in Production Example 4, Mw=1,670, Mn=980

(Y'2-2): Hydroborated polybutene containing an unsaturated group at one end obtained in Production Example 5, Mw=4,100, Mn=2,300

(Y'3-1): Maleic anhydride-ene-amino alcohol adduct of polybutene containing an unsaturated group at one end obtained in Production Example 6, Mw=6,800, Mn=3,030

The polymer having a hydroxyl group at one end was esterified to prepare the following monomers.

A monomer (a'-3) was a commercial product.

(a-1): Esterification product of (Y1-1) with methacrylic acid, Mw=1,860, Mn=1,720

(a-2): Esterification product of (Y1-2) with methacrylic acid, Mw=1,490, Mn=1,360

(a-3): Esterification product of (Y1-3) with methacrylic acid, Mw=3,670, Mn=3,100

(a'-1): Esterification product of (Y'1-1) with methacrylic acid, Mw=5,300, Mn=4,800

(a'-2): Esterification product of (Y'1-2) with methacrylic acid, Mw=5,410, Mn=5,230

(a'-3): Esterification product of hydrogenated polybutadiene containing a hydroxyl group at one end with methacrylic acid (product name: L-1253, Kuraray Co., Ltd.), Mw=4,400, Mn=4,200, molar ratio of 1,2-adduct/1,4-adduct=50/50

(a'-4): Esterification product of (Y'2-1) with methacrylic acid, Mw=1,740, Mn=1,050

(a'-5): Esterification product of (Y'2-2) with methacrylic acid, Mw=4,160, Mn=2,350

(a'-6): Esterification product of (Y'3-1) with methacrylic acid, Mw=6,900, Mn=3,100 Table 1 tabulates the molecular weights of the (a-1) to (a-3) and (a'-1) to (a'-6).

TABLE 1

| | GPC measurement condition 1 | | GPC measurement condition 2 | |
|---|---|---|---|---|
| | Mw | Mn | Mw | Mn |
| (a-1) | 1,860 | 1,720 | 3,360 | 3,170 |
| (a-2) | 1,490 | 1,360 | 2,800 | 2,730 |
| (a-3) | 3,670 | 3,100 | 5,710 | 4,850 |
| (a'-1) | 5,300 | 4,800 | 7,960 | 6,940 |
| (a'-2) | 5,410 | 5,230 | 8,400 | 7,600 |
| (a'-3) | 4,400 | 4,200 | 6,600 | 6,200 |
| (a'-4) | 1,740 | 1,050 | 2,800 | 1,650 |
| (a'-5) | 4,160 | 2,350 | 5,600 | 3,520 |
| (a'-6) | 6,900 | 3,100 | 11,270 | 4,830 |

Examples 1, 3 to 9, and 11 to 13 and Comparative Examples 4, 6 to 9, 11, and 14 to 17

A reaction vessel equipped with a stirrer, a heating and cooling device, a thermometer, a dropping funnel, a nitrogen inlet tube, and a pressure reducing device was charged with a base oil A (SP value: 8.3 $(cal/cm^3)^{1/2}$; kinematic viscosity at 100° C.: 2.5 mm²/s; viscosity index: 96) (100 parts by weight). Separately, a glass beaker was charged with the monomers shown in Tables 2 and 3, dodecyl mercaptan as a chain transfer agent, and t-butyl benzoyl peroxide (0.25 parts by weight), followed by stirring and mixing at 20° C. to prepare a monomer solution which was then injected into the dropping funnel. The gas phase of the reaction vessel was purged with nitrogen. Then, while the temperature in the sealed system was maintained at 100° C. to 110° C., the monomer solution was dropped over 3 hours, and was aged at 110° C. for 3 hours after the dropping was finished. Then, the temperature was raised to 120° C. to 130° C., and the unreacted monomer was removed over 2 hours at the same temperature under a reduced pressure (0.027 to 0.040 MPa). Thus, viscosity index improvers (R-1), (R-3) to (R-9), (R-11) to (R-13), (R'-4), (R'-6) to (R'-9), (R'-11), and (R'-14) to (R'-17) containing copolymers (A-1), (A-3) to (A-9), (A-11) to (A-13), (A'-4), (A'-6) to (A'-9), (A'-11), and (A'-14) to (A'-17), respectively, were obtained.

The SP values of the copolymers (A-1), (A-3) to (A-9), (A-11) to (A-13), (A'-4), (A'-6) to (A'-9), (A'-11), and (A'-14) to (A'-17) were calculated by the above method, and the Mw of each of these copolymers was measured by the above method.

Examples 2 and 10, and Comparative Examples 1 to 3, 5, 10, 12, and 13

A reaction vessel equipped with a stirrer, a heating and cooling device, a thermometer, a dropping funnel, a nitrogen inlet tube, and a pressure reducing device was charged with a base oil A (SP value: 8.3 (cal/cm3)$^{1/2}$; kinematic viscosity at 100° C.: 2.5 mm²/s; viscosity index: 96) (100 parts by weight). Separately, a glass beaker was charged with the monomers shown in Tables 2 and 3, dodecyl mercaptan as a chain transfer agent, 2,2'-azobis(2,4-dimethyl valeronitrile) (0.5 parts by weight), and 2,2'-azobis(2-methylbutyronitrile) (0.2 parts by weight), followed by stirring and mixing at 20° C. to prepare a monomer solution which was then injected into the dropping funnel. The gas phase of the reaction vessel was purged with nitrogen. Then, while the temperature in the sealed system was maintained at 70° C. to 85° C., the monomer solution was dropped over 2 hours, and was aged at 85° C. for 2 hours after the dropping was finished. Then, the temperature was raised to 120° C. to 130° C., and the unreacted monomer was removed over 2 hours at the same temperature under a reduced pressure (0.027 to 0.040 MPa). Thus, viscosity index improvers (R-2), (R-10), (R'-1) to (R'-3), (R'-5), (R'-10), (R'-12), and (R'-13) containing copolymers (A-2), (A-10), (A'-1) to (A'-3), (A'-5), (A'-10), (A'-12), and (A'-13), respectively, were obtained.

The SP values of the copolymers (A-2), (A-10), (A'-1) to (A'-3), (A'-5), (A'-10), (A'-12), and (A'-13) were calculated by the above method, and the Mw of each of these copolymers was measured by the above method.

<Method for Measuring Shear Stability Under Long-Term Stress (Long-Term Stability)>

A stainless steel vessel equipped with a stirrer was charged with YUBASE-3 available from SK Lubricants Japan Co., Ltd. (SP value: 8.3 (cal/cm³)$^{1/2}$; kinematic viscosity at 100° C.: 3.1 mm²/s; viscosity index: 106). Subsequently, the viscosity index improvers (R-1) to (R-13) and (R'-1) to (R'-17) were separately added to obtain lubricating oil compositions having a viscosity at 100° C. of 5.40±0.02 (mm²/s). Thus, lubricating oil compositions (V-1) to (V-13), (V'-1) to (V'-17) were obtained.

The resulting lubricating oil compositions (V-1) to (V-13), (V'-1) to (V'-17) were subjected to a shear test for 250 hours by the method of CEC L-45-99. After the shear test, the appearance of each lubricating oil composition was observed, and the presence or absence of a precipitate was determined. Tables 2 and 3 show the results. The shear stability under long-term stress (long-term stability) was evaluated by this method.

The compositions of the monomers (b) to (i) described in Tables 2 and 3 are as follows.
(b-1): Methyl methacrylate
(b-2): Ethyl methacrylate
(b-3): Butyl methacrylate
(c-1): Ethoxyethyl (meth)acrylate
(c-2): Butoxyethyl (meth)acrylate
(d-1): n-Dodecyl methacrylate
(d-2): Mixture of n-hexadecyl methacrylate and n-octadecyl methacrylate at a weight ratio of 7/3
(e-1): 2-n-Decyltetradecyl methacrylate
(e-2): Mixture of 2-n-dodecylhexadecyl methacrylate and 2-n-tetradecyloctadecyl methacrylate at a weight ratio of 1/1
(f-1): N,N-dimethylaminoethyl methacrylate
(f-2): N—(N',N'-dimethylaminopropyl)methacrylamide
(f-3): N-vinylpyrrolidone
(g-1): 2-Hydroxyethyl methacrylate
(h-1): Methacryloyloxyethyl phosphate
(i-1): Styrene

TABLE 2

|  |  | Example 1 | Example 2 | Example 3 | Example 4 | Example 5 | Example 6 | Example 7 |
|---|---|---|---|---|---|---|---|---|
| Lubricating oil composition | | (V-1) | (V-2) | (V-3) | (V-4) | (V-5) | (V-6) | (V-7) |
| Viscosity index improver | | (R-1) | (R-2) | (R-3) | (R-4) | (R-5) | (R-6) | (R-7) |
| Copolymer | | (A-1) | (A-2) | (A-3) | (A-4) | (A-5) | (A-6) | (A-7) |
| Composition | (a-1) | 30 | 31 | 25 | 22 | 15 | 21 | |
| | (a-2) | | | | | 15 | | 22.5 |
| | (a-3) | | | | | | | |
| | (a'-1) | | | | | | | |
| | (a'-2) | | | | | | | |
| | (a'-3) | | | | | | | |
| | (a'-4) | | | | | | | |
| | (a'-5) | | | | | | | |
| | (a'-6) | | | | | 2 | | |
| | (b-1) | | | | 46 | | | |
| | (b-2) | | | 45 | | | | |
| | (b-3) | 45 | 49 | | | 30 | 45 | 50.5 |
| | (c-1) | 25 | | 20 | | | | |
| | (c-2) | | 10 | | | | | 9 |

TABLE 2-continued

| | | | | | | | | |
|---|---|---|---|---|---|---|---|---|
| | (d-1) | | 10 | | | | | |
| | (d-2) | | | | | 10 | 10 | 10 |
| | (e-1) | | | | | | 10 | |
| | (e-2) | | | 10 | 30 | | | |
| | (f-1) | | | | | | | 2 |
| | (f-2) | | | | | | | |
| | (f-3) | | | | | | | |
| | (g-1) | | | | | | | |
| | (h-1) | | | | | | | |
| | (i-1) | | | | | 30 | 5 | 15 |
| Total | | 100 | 100 | 100 | 100 | 100 | 100 | 100 |
| Mw of (A) or (A') (×10$^4$) under GPC measurement conditions 1 | | 9.5 | 10.9 | 13.1 | 12.2 | 5.1 | 9.6 | 11.1 |
| Mw of (A) or (A') (×10$^4$) under GPC measurement conditions 2 | | 11.6 | 13.3 | 15.9 | 14.8 | 6.2 | 11.7 | 13.6 |
| SP values of (A) or (A') | | 9.14 | 9.13 | 9.22 | 9.13 | 9.37 | 9.13 | 9.32 |
| Molecular weight of copolymer segments per repeating unit of monomer | | 6,200 | 5,813 | 7,440 | 9,500 | 5,583 | 8,857 | 6,622 |
| Presence or absence of precipitate after 250 h test in KRL tester | | Absent | Absent | Absent | Absent | Absent | Absent | Absent |

| | | Example 8 | Example 9 | Example 10 | Example 11 | Example 12 | Example 13 |
|---|---|---|---|---|---|---|---|
| Lubricating oil composition | | (V-8) | (V-9) | (V-10) | (V-11) | (V-12) | (V-13) |
| Viscosity index improver | | (R-8) | (R-9) | (R-10) | (R-11) | (R-12) | (R-13) |
| Copolymer | | (A-8) | (A-9) | (A-10) | (A-11) | (A-12) | (A-13) |
| Composition | (a-1) | | 27.5 | | | 39 | |
| | (a-2) | 27.5 | | 50 | 14 | | |
| | (a-3) | | | | | | 35 |
| | (a'-1) | | | | | | |
| | (a'-2) | | | | | | |
| | (a'-3) | | | | | | |
| | (a'-4) | | | | | | |
| | (a'-5) | | | | | | |
| | (a'-6) | | | | | | |
| | (b-1) | | | 30 | | | |
| | (b-2) | | | 18 | 5 | | |
| | (b-3) | 50 | 50 | | 42 | 38 | 45 |
| | (c-1) | 20.5 | 20.5 | | | | |
| | (c-2) | | | | | 19 | 15 |
| | (d-1) | | | | 2 | | |
| | (d-2) | | | | | | 5 |
| | (e-1) | | | 2 | | | |
| | (e-2) | | | | 33 | | |
| | (f-1) | | | | | | |
| | (f-2) | | | | | | |
| | (f-3) | | | | | | |
| | (g-1) | 2 | | | | | |
| | (h-1) | | 2 | | | | |
| | (i-1) | | | | 4 | 4 | |
| Total | | 100 | 100 | 100 | 100 | 100 | 100 |
| Mw of (A) or (A') (×10$^4$) under GPC measurement conditions 1 | | 25.0 | 15.0 | 10.0 | 10.2 | 30.1 | 11.0 |
| Mw of (A) or (A') (×10$^4$) under GPC measurement conditions 2 | | 30.9 | 18.4 | 12.1 | 12.5 | 38.9 | 13.4 |
| SP values of (A) or (A') | | 9.27 | 9.20 | 9.11 | 9.10 | 9.04 | 9.08 |
| Molecular weight of copolymer segments per repeating unit of monomer | | 5,418 | 6,764 | 2,980 | 10,643 | 4,769 | 10,486 |
| Presence or absence of precipitate after 250 h test in KRL tester | | Absent | Absent | Absent | Absent | Absent | Absent |

TABLE 3

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Lubricating oil composition | | (V'-1) | (V'-2) | (V'-3) | (V'-4) | (V'-5) | (V'-6) | (V'-7) | (V'-8) | (V'-9) |
| Viscosity index improver | | (R'-1) | (R'-2) | (R'-3) | (R'-4) | (R'-5) | (R'-6) | (R'-7) | (R'-8) | (R'-9) |
| Copolymer | | (A'-1) | (A'-2) | (A'-3) | (A'-4) | (A'-5) | (A'-6) | (A'-7) | (A'-8) | (A'-9) |
| Composition | (a-1) | | | | | | | | | |
| | (a-2) | | | | | | | | | |
| | (a-3) | | | | | | | | | |
| | (a'-1) | | | | | | | 28 | 12 | 8.41 | 44 |
| | (a'-2) | | | | | | | | | |
| | (a'-3) | 45 | | | 45 | | | | | |
| | (a'-4) | | | | | 48.1 | | | | |
| | (a'-5) | | 43.1 | 37.3 | | | | | | |
| | (a'-6) | | | | | | | | | |
| | (b-1) | | | | 5.5 | | | | 40.03 | 0.2 |
| | (b-2) | | | | | | | | | |
| | (b-3) | 15 | 14.3 | 22.1 | 49.5 | 51.9 | 58 | 83 | 3.56 | 8.4 |
| | (c-1) | | | | | | | | | |
| | (c-2) | | | | | | | | | |
| | (d-1) | | | | | | | | | |
| | (d-2) | | | | | | | 5 | 40.03 | 0.2 |
| | (e-1) | | | | | | | | | |
| | (e-2) | | | | | | | | | |
| | (f-1) | | | | | | | | | |
| | (f-2) | | | | | | | | | 3.4 |
| | (f-3) | | | | | | | | | |
| | (g-1) | | | | | | | | | |
| | (h-1) | | | | | | | | | |
| | (i-1) | 40 | 42.6 | 40.6 | | | 14 | | 7.97 | 43.8 |
| Total | | 100 | 100 | 100 | 100 | 100 | 100 | 100 | 100 | 100 |
| MW of (A) or (A') ($\times 10^4$) under GPC measurement conditions 1 | | 22.9 | 11.0 | 11.8 | 32.2 | 28.3 | 15.5 | 26.0 | 16.0 | 33.3 |
| Mw of (A) or (A') ($\times 10^4$) under GPC measurement conditions 2 | | 28.3 | 13.5 | 14.4 | 40.o | 35.1 | 19.0 | 32.3 | 22.2 | 41.4 |
| SP value of (A) or (A') | | 9.33 | 9.12 | 9.20 | 8.96 | 8.868 | 9.25 | 9.27 | 9.37 | 9.40 |
| Molecular weight of copolymer segments per repeating unit of monomer | | 9,778 | 9,652 | 11,153 | 9,778 | 3,617 | 18,929 | 44,167 | 63,020 | 12,045 |
| Presence of absence of precipitate after 250 h test in KRL tester | | Present | Absent | Absent | Present | Absent | Present | Present | Present | Present |

| | | Comparative Example 10 | Comparative Example 11 | Comparative Example 12 | Comparative Example 13 | Comparative Example 14 | Comparative Example 15 | Comparative Example 16 | Comparative Example 17 |
|---|---|---|---|---|---|---|---|---|---|
| Lubricating oil composition | | (V'-10) | (V'-11) | (V'-12) | (V'-13) | (V'-14) | (V'-15) | (V'-16) | (V'-17) |
| Viscosity index improver | | (R'-10) | (R'-11) | (R'-12) | (R'-13) | (R'-14) | (R'-15) | (R'-16) | (R'-17) |
| Copolymer | | (A'-10) | (A'-11) | (A'-12) | (A'-13) | (A'-14) | (A'-15) | (A'-16) | (A'-17) |
| Composition | (a-1) | | | | | 5 | 70 | 50 | 15 |
| | (a-2) | | | | | | | | |
| | (a-3) | | | | | | | | |
| | (a'-1) | 80 | 42 | | | | | | |
| | (a'-2) | | | 10 | | | | | |
| | (a'-3) | | | | | | | | |
| | (a'-4) | | | | 5 | | | | |
| | (a'-5) | | | | | | | | |
| | (a'-6) | | | | | | | | |
| | (b-1) | 0.2 | 39.8 | 10 | | 5 | 10 | | |
| | (b-2) | | | | | | | | |
| | (b-3) | 0.2 | 0.2 | 30 | | 65 | 10 | 30 | 60 |
| | (c-1) | | | | 5 | | | | |
| | (c-2) | | | 20 | 50 | 5 | | | |
| | (d-1) | | | | | | | | |
| | (d-2) | 9.4 | 0.2 | 20 | 20 | 9 | | 20 | |
| | (e-1) | | | | | | | | |
| | (e-2) | | | 10 | 10 | | | | |
| | (f-1) | | | | | | 5 | | |
| | (f-2) | | | | | | | | |

TABLE 3-continued

|  | | | | | | | | | |
|---|---|---|---|---|---|---|---|---|---|
| (f-3) | 10 | | | | | | | | |
| (g-1) | | | | 10 | | | | | |
| (h-1) | | | | | | | | | |
| (i-1) | 0.2 | 17.8 | | | 6 | 10 | | 25 | |
| Total | 100 | 100 | 100 | 100 | 100 | 100 | 100 | 100 | |
| MW of (A) or (A') (×10⁴) under GPC measurement conditions 1 | 12.1 | 30.5 | 16.0 | 40.0 | 11.4 | 11.1 | 12.1 | 11.6 | |
| Mw of (A) or (A') (×10⁴) under GPC measurement conditions 2 | 14.8 | 37.6 | 19.7 | 49.7 | 13.9 | 13.5 | 15.1 | 14.0 | |
| SP value of (A) or (A') | 8.72 | 9.28 | 0.17 | 9.54 | 9.42 | 8.82 | 8.80 | 9.53 | |
| Molecular weight of copolymer segments per repeating unit of monomer | 6,625 | 12,619 | 54,100 | 34,800 | 37,200 | 2,657 | 3,720 | 12,400 | |
| Presence of absence of precipitate after 250 h test in KRL tester | Absent | Present | Present | Present | Present | Absent | Absent | Present | |

Examples 14 to 26 and Comparative Examples 18 to 23

The shear stability, 40° C. kinetic viscosity, 100° C. kinetic viscosity, viscosity index, and low-temperature viscosity (−40° C.) were measured by the following methods for the lubricating oil compositions (V-1) to (V-13) each having good shear stability under long-term stress (long-term stability) and the comparative lubricating oil compositions (V'-2), (V'-3), (V'-5), (V'-10), (V'-15), and (V'-16). Table 4 shows the results.

<Method of Calculating Shear Stability of Lubricating Oil Composition>

The shear stability was calculated by the method of JASO M347-2007.

<Method of Measuring Low-Temperature Viscosity (−40° C.) of Lubricating Oil Composition>

The low-temperature viscosity was measured at −40° C. by the method of ASTM D 2983.

As is clear from the results of Tables 2 to 4, the lubricating oil compositions (Examples 14 to 26) each containing the viscosity index improver of the present invention have an

TABLE 4

| | Example 14 | Example 15 | Example 16 | Example 17 | Example 18 | Example 19 | Example 20 | Example 21 | Example 22 | Example 23 |
|---|---|---|---|---|---|---|---|---|---|---|
| Viscosity index improver | (R-1) | (R-2) | (R-3) | (R-4) | (R-5) | (R-6) | (R-7) | (R-8) | (R-9) | (R-10) |
| Lubricating oil composition | (V-1) | (V-2) | (V-3) | (V-4) | (V-5) | (V-6) | (V-7) | (V-8) | (V-9) | (V-10) |
| Shear stability | 10.6 | 11.2 | 13.3 | 13.0 | 3.1 | 10.7 | 11.4 | 17.4 | 13.4 | 9.1 |
| Kinetic viscosity at 40° C. (mm²/s) | 18.3 | 18.0 | 17.2 | 18.2 | 19.8 | 18.4 | 18.1 | 16.9 | 17.5 | 18.9 |
| Kinetic viscosity at 100° C. (mm²/s) | 5.4 | 5.4 | 5.4 | 5.4 | 5.4 | 5.4 | 5.4 | 5.4 | 5.4 | 5.4 |
| Viscosity index | 265 | 249 | 292 | 267 | 234 | 263 | 269 | 300 | 284 | 252 |
| Low-temperature viscosity (mPa·s) | 6000 | 4500 | 5500 | 4000 | 6000 | 8200 | 6800 | 7200 | 7900 | 7200 |

| | Example 24 | Example 25 | Example 26 | Comparative Example 18 | Comparative Example 19 | Comparative Example 20 | Comparative Example 21 | Comparative Example 22 | Comparative Example 23 |
|---|---|---|---|---|---|---|---|---|---|
| Viscosity index improver | (R-11) | (R-12) | (R-13) | (R'-2) | (R'-3) | (R'-5) | (R'-10) | (R'-15) | (R'-16) |
| Lubricating oil composition | (V-11) | (V-12) | (V-13) | (V'-2) | (V'-3) | (V'-5) | (V'-10) | (V'-15) | (V'-16) |
| Shear stability | 9.9 | 19.8 | 11.0 | 10.8 | 11.9 | 19.7 | 7.8 | 9.0 | 9.7 |
| Kinetic viscosity at 40° C. (mm²/s) | 18.4 | 16.8 | 18.2 | 20.0 | 19.7 | 17.9 | 22.3 | 21.7 | 21.6 |
| Kinetic viscosity at 100° C. (mm²/s) | 5.4 | 5.4 | 5.4 | 5.4 | 5.4 | 5.4 | 5.4 | 5.4 | 5.4 |
| Viscosity index | 263 | 303 | 268 | 230 | 235 | 274 | 193 | 202 | 204 |
| Low-temperature viscosity (mPa·s) | 7600 | 6000 | 8600 | 13000 | 12000 | 8100 | 16000 | 12000 | 9100 |

<Method of Measuring Kinetic Viscosity and Method of Calculating Viscosity Index of Lubricating Oil Composition>

The kinetic viscosity at 40° C. and 100° C. was measured by the method of ASTM D 445, and calculated by the method of ASTM D 2270.

excellent balance of shear stability and viscosity index and are also sufficiently low in low-temperature viscosity (9,000 mPa·s or less). For example, when a comparison is made between Example 14 and Comparative Example 18, the shear stability is nearly the same, but Example 14 shows a significant increase in viscosity index. When a comparison is made between Example 18 and Comparative Examples 18 and 19, the viscosity index is nearly the same, but Example 18 shows a significant improvement in shear stability.

In contrast, the lubricating oil compositions each containing one of the viscosity index improvers of Comparative Examples 1 to 23 have a poor balance between shear stability and viscosity index, and at least one of low-temperature viscosity, shear stability under long-term stress is poor.

INDUSTRIAL APPLICABILITY

The lubricating oil composition containing the viscosity index improver of the present invention is suitably used for gear oils (e.g., differential oil and industrial gear oil), MTF, transmission fluids (e.g., ATF, DCTF, and belt-CVTF), traction fluids (e.g., toroidal-CVTF), shock absorber fluids, power steering fluids, and hydraulic oils (e.g., construction machinery hydraulic oil and industrial hydraulic oil).

The invention claimed is:

1. A viscosity index improver comprising:
a copolymer (A) whose essential constituent monomer is a monomer (a) having a number average molecular weight of 800 to 4,000 represented by the following formula (1), the copolymer (A) having a solubility parameter in the range of 9.00 to 9.40:

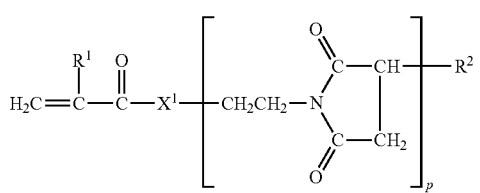

wherein $R^1$ is a hydrogen atom or a methyl group; $—X^1—$ is a group represented by $—O—$, $—O(AO)_m—$, or $—NH—$, AO is a C2-C4 alkyleneoxy group, m is an integer of 1 to 10, each AO may be the same or different when m is 2 or more, and the $(AO)_m$ moieties may be randomly bonded or block-bonded; $R^2$ is a residue after removal of one hydrogen atom from a hydrocarbon polymer whose essential constituent monomer is butadiene in which the butadiene is present in a proportion of 50% by weight or more based on the weight of $R^2$, or after removal of one hydrogen atom from a polymer formed by partial hydrogenation of the hydrocarbon polymer; and p represents a number of 0 or 1, and wherein in the formula (1), a structure derived from the butadiene constituting a part or all of $R^2$ has a 1,2-adduct/1,4-adduct molar ratio of 40/60 to 70/30.

2. The viscosity index improver according to claim 1, wherein the molecular weight of copolymer segments per repeating unit of the monomer (a) as calculated by the following formula (1) is 2,500 to 11,000:

Molecular weight of copolymer segments per repeating unit=$M×A/a$ (1)

where M is the weight average molecular weight of the monomer (a); a is the total weight of the monomer (a) constituting the copolymer (A); and A is the total weight of all monomers constituting the copolymer (A).

3. The viscosity index improver according to claim 1, wherein the copolymer (A) contains, as a constituent monomer, 10 to 50% by weight of the monomer (a) based on the weight of the copolymer (A).

4. The viscosity index improver according to claim 1, wherein the copolymer (A) has a weight average molecular weight of 5,000 to 2,000,000.

5. The viscosity index improver according to claim 1, wherein the copolymer (A) is a copolymer further containing an alkyl (meth)acrylate (b) having a C1-C4 alkyl group as a constituent monomer.

6. The viscosity index improver according to claim 1, wherein the copolymer (A) is a copolymer further containing a monomer (c) represented by the following formula (2) as a constituent monomer:

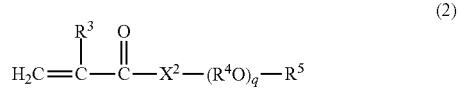

wherein $R^3$ is a hydrogen atom or a methyl group; $—X^2—$ is a group represented by $—O—$ or $—NH—$; $R^4O$ is a C2-C4 alkyleneoxy group; $R^5$ is a C1-C8 alkyl group; and q is an integer of 1 to 20, each $R^4O$ may be the same or different when q is 2 or more, and the $(R^4O)_q$ moieties may be randomly bonded or block-bonded.

7. The viscosity index improver according to claim 1, wherein the copolymer (A) is a copolymer further containing, as a constituent monomer, at least one of an alkyl (meth)acrylate (d) having a C12-C36 linear alkyl group or a monomer (e) represented by the following formula (3):

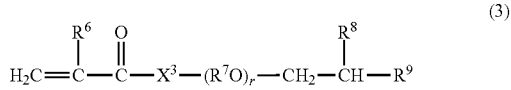

wherein $R^6$ is a hydrogen atom or a methyl group; $—X^3—$ is a group represented by $—O—$ or $—NH—$; $R^7O$ is a C2-C4 alkyleneoxy group; $R^8$ and $R^9$ are each independently a C4-C24 linear alkyl group; and r is an integer of 0 to 20, each $R^7O$ may be the same or different when r is 2 or more, and the $(R^7O)_r$ moieties may be randomly bonded or block-bonded.

8. The viscosity index improver according to claim 1, wherein the copolymer (A) contains, as constituent monomers, 10 to 50% by weight of the monomer (a), 1 to 80% by weight of the following monomer (b), 0 to 60% by weight of the following monomer (c), 0 to 40% by weight of the following monomer (d), and 0 to 40% by weight of the following monomer (e), based on the weight of the copolymer (A):
monomer (b): alkyl (meth)acrylate having a C1-C4 alkyl group;
monomer (c): monomer represented by the following formula (2):

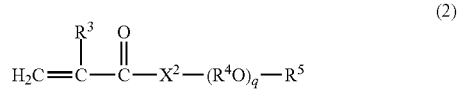

wherein $R^3$ is a hydrogen atom or a methyl group; $—X^2—$ is a group represented by $—O—$ or $—NH—$; $R^4O$ is a C2-C4 alkyleneoxy group; $R^5$ is a C1-C8 alkyl group; and q is an integer of 1 to 20, each $R^4O$ may be the same or different when q is 2 or more, and the $(R^4O)_q$ moieties may be randomly bonded or block-bonded;

monomer (d): alkyl (meth)acrylate having a C12-C36 linear alkyl group; and monomer (e): monomer represented by the following formula (3),

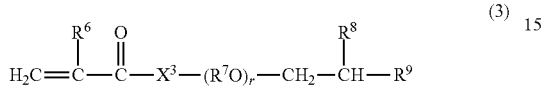

wherein $R^6$ is a hydrogen atom or a methyl group; $—X^3—$ is a group represented by —O— or —NH—; $R^7O$ is a C2-C4 alkyleneoxy group; $R^8$ and $R^9$ are each independently a C4-C24 linear alkyl group; and r is an integer of 0 to 20, each $R^7O$ may be the same or different when r is 2 or more, and the $(R^7O)_r$ moieties may be randomly bonded or block-bonded.

9. The viscosity index improver according to claim 1, wherein the copolymer (A) is a copolymer further containing at least one monomer selected from the group consisting of a nitrogen atom-containing monomer (f), a hydroxyl group-containing monomer (g), a phosphorus atom-containing monomer (h), and an aromatic ring-containing vinyl monomer (i).

10. The viscosity index improver according to claim 1, further containing a (co)polymer (B) represented by the following formula (4), and the weight ratio (A)/(B) of the copolymer (A) to the (co)polymer (B) is 90/10 to 99.8/0.2:

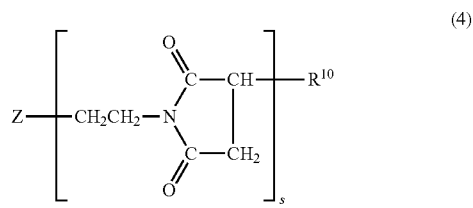

wherein Z is a hydrogen atom, a methyl group, or a group represented by $Y—X^4—$; Y is a hydrogen atom or a (meth)acryloyl group; $—X^4—$ is a C1-C10 alkylene group or a group represented by —O—, $—O(AO)_t—$, or —NH—, AO is a C2-C4 alkyleneoxy group, t is an integer of 1 to 10, each AO may be the same or different when t is 2 or more, and the $(AO)_t$ moieties may be randomly bonded or block-bonded; and $R^1$ is a polymer of at least one monomer selected from the group consisting of a C2-C18 olefin, a C4-C10 alkadiene, and a C8-C17 styrene derivative, or when the polymer has an unsaturated group, $R^{10}$ is a residue after removal of one hydrogen atom from the polymer in which the unsaturated group is partially or completely hydrogenated; and s is a number of 0 or 1.

11. A lubricating oil composition comprising:
at least one base oil selected from the group consisting of API Group I to IV base oils, GTL base oils, and synthetic lubricant base oils; and
the viscosity index improver according to claim 1, wherein the amount of the copolymer (A) in the lubricating oil composition is 0.1 to 20% by weight.

12. The lubricating oil composition according to claim 11, further containing at least one additive selected from the group consisting of dispersants, detergents, antioxidants, oiliness improvers, pour point depressants, friction and wear modifiers, extreme pressure additives, defoamers, demulsifiers, metal deactivators, and corrosion inhibitors, in a total amount of 0.1 to 30% by weight.

\* \* \* \* \*